(12) United States Patent
Lindman et al.

(10) Patent No.: US 10,417,045 B2
(45) Date of Patent: Sep. 17, 2019

(54) EMBEDDED COMPUTING DEVICE

(71) Applicant: Suunto Oy, Vantaa (FI)

(72) Inventors: Erik Lindman, Vantaa (FI); Jyrki Uusitalo, Vantaa (FI); Timo Eriksson, Vantaa (FI); Tomi Lehto, Vantaa (FI); Tero Aurto, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 0 days.

(21) Appl. No.: 15/131,038

(22) Filed: Apr. 18, 2016

(65) Prior Publication Data
US 2016/0306748 A1 Oct. 20, 2016

(30) Foreign Application Priority Data

Apr. 17, 2015 (FI) ..................................... 20155288
Apr. 17, 2015 (GB) ................................... 1506568.3

(51) Int. Cl.
*G06F 12/00* (2006.01)
*G06F 9/50* (2006.01)
*G06F 12/02* (2006.01)

(52) U.S. Cl.
CPC ............ *G06F 9/50* (2013.01); *G06F 12/0284* (2013.01); *G06F 2212/656* (2013.01)

(58) Field of Classification Search
CPC ... G06F 9/50; G06F 12/0284; G06F 2212/656
See application file for complete search history.

(56) References Cited

U.S. PATENT DOCUMENTS 5,428,760 A 6/1995 Ghori et al.
5,522,045 A 5/1996 Sandberg
(Continued)

FOREIGN PATENT DOCUMENTS

EP 2017741 A1 1/2009
EP 2328095 A1 6/2011
(Continued)

OTHER PUBLICATIONS

Kyriazis G.: Hetergenous System Architecture: A Technical Review. Internet Archive Jul. 1, 2015.
Wikipedia: Heteregenous System Architecture. Feb. 3, 2015.

*Primary Examiner* — Gurtej Bansal
(74) *Attorney, Agent, or Firm* — Seppo Laine Oy (57) ABSTRACT

An apparatus and a method is provided that comprises at least one first processing unit configured to run at least one first computer program application capable of receiving and processing signals received from at least one interface or device connected to said first processing unit, at least one second processing unit configured to run at least a second computer program application capable of further processing at least some information processed in said first processing unit. According to the invention the first and second processing unit are interfaced with a shared information space, whereby a first application running in the first processing unit is configured to enable said first processing unit to write data to said information space, and a second application running in the second processing unit is configured to receive a notification about said data being written to said shared information space, and to enable said second processing unit to retrieve from said information space said data written by said first processing unit for further processing.

27 Claims, 2 Drawing Sheets

(56) References Cited

U.S. PATENT DOCUMENTS

| | | | |
|---|---|---|---|
| 6,249,893 B1* | 6/2001 | Rajsuman | G01B 31/318385 714/738 |
| 2004/0024821 A1 | 2/2004 | Hady | |
| 2006/0069738 A1 | 3/2006 | Hoogerbrugge | |
| 2006/0288174 A1 | 12/2006 | Nace et al. | |
| 2007/0140199 A1 | 6/2007 | Zhao et al. | |
| 2007/0174411 A1 | 7/2007 | Brokenshire et al. | |
| 2007/0234007 A1 | 10/2007 | Lin et al. | |
| 2008/0170460 A1 | 7/2008 | Oh et al. | |
| 2008/0244231 A1 | 10/2008 | Kunze et al. | |
| 2009/0089505 A1 | 4/2009 | Vasudevan et al. | |
| 2010/0118041 A1 | 5/2010 | Chen et al. | |
| 2010/0318725 A1 | 12/2010 | Kwon | |
| 2011/0161540 A1* | 6/2011 | Chang | G06F 9/526 710/200 |
| 2011/0283031 A1* | 11/2011 | Lee | G06F 13/4221 710/110 |
| 2012/0017031 A1 | 1/2012 | Mashtizadeh et al. | |
| 2012/0079501 A1* | 3/2012 | Sandstrom | G06F 9/5066 718/105 |
| 2012/0100895 A1 | 4/2012 | Priyantha | |
| 2012/0131285 A1* | 5/2012 | Leshchiner | G06F 9/52 711/147 |
| 2012/0254497 A1 | 10/2012 | Ni et al. | |
| 2013/0339662 A1 | 12/2013 | Goryachev et al. | |
| 2014/0040553 A1 | 2/2014 | Liang et al. | |
| 2014/0049548 A1 | 2/2014 | Rao et al. | |
| 2014/0094829 A1 | 4/2014 | Kostrzewski | |

FOREIGN PATENT DOCUMENTS

| | | |
|---|---|---|
| GB | 2284494 A | 6/1995 |
| GB | 2476360 A | 6/2011 |
| GB | 2483884 A | 3/2012 |
| GB | 2503477 A | 1/2014 |
| WO | WO2004064119 A1 | 7/2004 |
| WO | WO2006055477 A1 | 5/2006 |
| WO | WO 2007085522 A2 | 8/2007 |
| WO | WO2012068302 A2 | 5/2012 |
| WO | WO2012134546 A1 | 10/2012 |
| WO | WO2014193672 A1 | 12/2014 |

* cited by examiner

EMBEDDED COMPUTING DEVICE

FIELD OF INVENTION

The present invention in general relates, for example, to implementing multi-core or multi-chip solutions in devices intended to be used by humans through user interfaces.

BACKGROUND OF INVENTION

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network.

More complex embedded devices, such as cellular telephones, may allow a user to install applications into a memory, such as, for example, a solid-state memory, comprised in the device. Embedded devices are frequently resource-constrained when compared to desktop or laptop computers. For example, memory capacity may be more limited than in desktop or laptop computers, processor computational capacity may be lower and energy may be available from a battery. The battery, which may be small, may be rechargeable.

An embedded device may be enabled to receive from a communications network information relating to, for example, a current time and current time zone. In the context of multiple processors in embedded devices, also the communication between processors and the memory they use becomes an issue. A fundamental question of traditional parallel computer design is to select between the two parallel computing paradigms:

Shared Memory—Usually via threads, all processors can access all memory directly at any time, and Distributed Memory—A processor can access only its own memory, but processors can share data using message passing, as in the NUMA (Non Uniform Memory Access) architecture.

For various reasons and design considerations, an embedded system may comprise more than one processor and/or microcontroller. In consumer devices, one of the processors may be dedicated for specific tasks, such as for digital signal processing (DSP) or graphics processing, or the processors may be have multiple cores for processing power. However, in small consumer devices, where conserving battery power is a task competing with power requirements, the number of processors must usually be kept as small and their power consumption as low as possible. As the development is towards embedded and distributed computing, which may include a multitude of sensors and connectivity needs with other peripheral devices, the traditional one-processor approach is not always possible. In practice the processors may, although embedded, be more like independent computers with a variety of processes and tasks to perform.

For example, a multitude of sensors, or a sensor hub containing or supporting such sensors, may be connected to a low power microcontroller running its independent applications for collecting and displaying basic information. A main processing unit running more computing-intensive applications, like color displays and graphics-intensive software, may be then waked up only on request, thus saving energy.

Asynchronous operation accounts for unpredictability in events and their timing. Concurrency may occur when peripherals like sensors share and may interrupt the same processor, or when multiple processors share the same memory. A major job of an operating system is to manage concurrent operations and the running applications. Concurrency control has however also become an integral part of many applications through multi-thread processes and their memory sharing algorithms that are working on memory pools or heaps.

There is a general problem in implementing communication in embedded multi-processor solutions in devices, i.e. how to enable the processors and their applications running on them to send, share and retrieve information between themselves, both on an ad-hoc (asynchronous) basis and concurrently. There are also specific problems in low-power embedded devices regarding the division of tasks and optimization of the power consumption of the processors.

It is an object of at least some of the embodiments of the present invention to provide a solution to interoperability and data sharing issues relating to embedded systems. The inventive idea is based on the use of a common information resource, hereafter a whiteboard, which is shared by different processors, processes and/or threads. The processes may be running in embedded devices themselves, on servers or on the internet. The whiteboard may be shared by a multitude of such devices. By managing the resources of such a memory e.g. by formatting and mapping techniques, naming and name space conventions and/or interface segmentation, the whiteboard may be used to improve interoperability and data sharing between different processors such as identified above, and the applications running on them.

SUMMARY OF THE INVENTION

The invention is defined by the features of the independent claims. Some specific embodiments are defined in the dependent claims.

Definitions

For the purpose of correct understanding of the various terms and components used in the following description, a non-exhaustive list of definition is offered as follows:

logical memory unit—a memory space accessible to a processing unit via a mapping or translating function may be shared between two or more processing units sensor hub—a unit (e.g. a microcontroller) that integrates and processes data from a multitude of sensors whiteboard—a shared information space, shared between any number of said processing unit being interfaced with it. A whiteboard acts as a shared memory space, but may work differently for different processes and applications according to their needs According to a first aspect of the present invention, there is provided an apparatus comprising:

at least one first processing unit configured to run at least one first computer program application capable of receiving and processing signals received from at least one interface or device connected to said first processing unit;

at least one second processing unit configured to run at least a second computer program application capable of further processing at least some information processed in said first processing unit; wherein said first and second processing unit are interfaced with a shared information space, whereby a first application running in the first processing unit is configured to enable said first processing unit to write data to said information space, and a second application running in the second processing unit is configured to receive a notification about said data being written to said shared information space, and to enable said second processing unit to retrieve from said information space said data written by said first processing unit for further processing.

Various embodiments of the first aspect may comprise at least one feature from the following bulleted list:

the first processing unit is electrically interfaced with at least one of: a user interface, an external memory unit, a wireless communications port, a first wired communications port, satellite positioning circuitry, a magnetometer, a gyroscope, an accelerometer and a pressure sensor;

the second processing unit is electrically interfaced with at least one of: a display, an external memory unit, a sensor, a cellular communication circuitry, a non-cellular wireless communication circuitry and a second wired communications port;

the shared information space consists of at least one random access memory unit interfaced with each processing unit, wherein the memory units are configured to communicate between each other by a data interchange protocol;

the shared information space consists of at least one random access memory unit interfaced with at least the first and the second processing unit, wherein the memory unit is configured to serve as a logical memory unit with at least one address space mapped to both the first and the second processing unit;

the apparatus comprises additionally at least one random access memory unit interfaced with at least the first and the second processing unit, wherein said random access memory is configured to receive address data written by said first processing unit that is pointing to an address in said external memory space, and said external memory space is configured to receive data written by said first processing unit at said address, whereby said second processing unit is configured to read the written address in said random access memory and to fetch data from said shared information space at said address;

a first application running on said first processing unit is adapted to write a current value of a parameter, such as time, to an address in said information space, and a second application running on said second processing unit is adapted to retrieve the parameter value from said information space;

a second application running on said second processing unit is adapted to put a request for the value of a parameter to be written in said information space, whereby a first application running on said first processing unit is adapted to write the parameter value to an address in said information space, and whereby said second application is adapted to fetch the parameter value from said address;

a first application running on said first processing unit overwrites in a constant and frequent fashion the previous value of a parameter with a current value in said information space;

a first application running on said first processing unit writes a value of a parameter valid for a period of time to an address in said information space, to be accessible for any application running in the apparatus and capable of reading said address;

a first application running in the first processing unit is further configured to write a control signal to said information space and to notify a second application running in the second processing unit of said control signal, whereby said second application is configured to fetch the control signal from said information space and cause the second processing unit to enter a hibernation state;

the first processing unit and the second processing unit have cores that are comprised in the same integrated circuit the first processing unit is has a microcontroller and the second processing unit has a microprocessor, the microcontroller being external to the microprocessor and the microprocessor being external to the microcontroller According to a second aspect of the present invention, there is provided a method comprising the steps of:

receiving, by a first processing unit, signals from at least one interface or device connected to said first processing unit;

processing said received signals in a first computer program application running on said first processing unit;

enabling said first computer program application to write data retrieved from said processed signals to a shared information space, receiving in a second computer program application running in a second processing unit a notification of said data written to said shared information space, enabling said second computer program application to read said data stored in said shared information space;

further processing said data in said second processing unit.

Various embodiments of the second aspect may comprise at least one feature from the following bulleted list:

the first processing unit is interfaced with at least one of: a user interface, an external memory unit, a wireless communications port, a wired communications port, satellite positioning circuitry, a magnetometer, a gyroscope, an accelerometer and a pressure sensor;

the second processing unit is electrically interfaced with at least one of: a display, an external memory unit, a cellular communication circuitry, non-cellular wireless communication circuitry and a second wired communications port;

the shared information space consists of at least one random access memory unit interfaced with each processing unit, and wherein the memory units are configured to communicate between each other by a data interchange protocol;

the shared information space consists of at least one random access memory unit interfaced with at least the first and the second processing unit, and wherein the memory unit is configured to serve as a logical memory unit with at least one address space mapped to both the first and the second processing unit;

the shared information space consists of an external memory space interfaced with at least the first and the second processing unit, and wherein said external memory space is configured to serve as a logical memory unit with at least one address space mapped to both the first and the second processing unit;

at least one random access memory unit being interfaced with at least the first and the second processing unit, receiving in said random access memory address data written by said first processing unit that is pointing to an address in said external memory space, receiving in said external memory space data written by said first processing unit at said address, reading in said second processing unit the written address in said random access memory, fetching by said second processing unit data from said shared information space at said address;

a first application running on said first processing unit is adapted to write the current value of a parameter, such as time, to an address in said information space, and a second application running on said second processing unit being adapted to retrieve the parameter value from said information space;

a second application running on said second processing unit is adapted to request for the value of a parameter to be written in said information space, whereby a first application running on said first processing unit is adapted to write the parameter value to said address, and whereby said second application is adapted to fetch said parameter value from said address;

the first application running on said first processing unit is adapted to overwrite in a constant and frequent fashion the previous value of a parameter with a current value in said information space;

a first application running on said first processing unit being adapted to write a value of a parameter valid for a period of time to an address in said information space, to be accessible for any application running in the apparatus capable of reading said address;

a first application running in the first processing unit is further configured to:

writing a control signal to said information space, and notifying a second application running in the second processing unit of said control signal, and said second application running in the second processing unit is configured to fetch the control signal from said information space and cause the second processing unit to enter a hibernation state.

According to a third aspect of the present invention, there is provided an apparatus comprising:
An apparatus comprising:
in a first processing unit,
  means for receiving and processing signals received from at least one interface or device connected to said first processing unit;
  means for enabling the first processing unit to write data to a shared information space,
  means for notifying a second processing unit that data has been written to said shared information space,
in said second processing unit,
  means to enable said second processing unit to read from said shared information space data written by said first processing unit;
  means to enable further processing of at least some information read from said shared information space being processed in said first processing unit, and;
  means for further processing of said read data in said second processing unit to in order to display, communicate over a communication link, or to cause the second processing unit to enter a hibernation state.

According to a fourth aspect of the present invention, there is provided computer program configured to cause a method in accordance with at least one of the method claims to be performed, when run.

INDUSTRIAL APPLICABILITY

At least some embodiments of the present invention find industrial application in embedded multi-chip or multi-core and memory usage optimization thereof.

DETAILED DESCRIPTION OF EXAMPLE EMBODIMENTS

Figure 1:
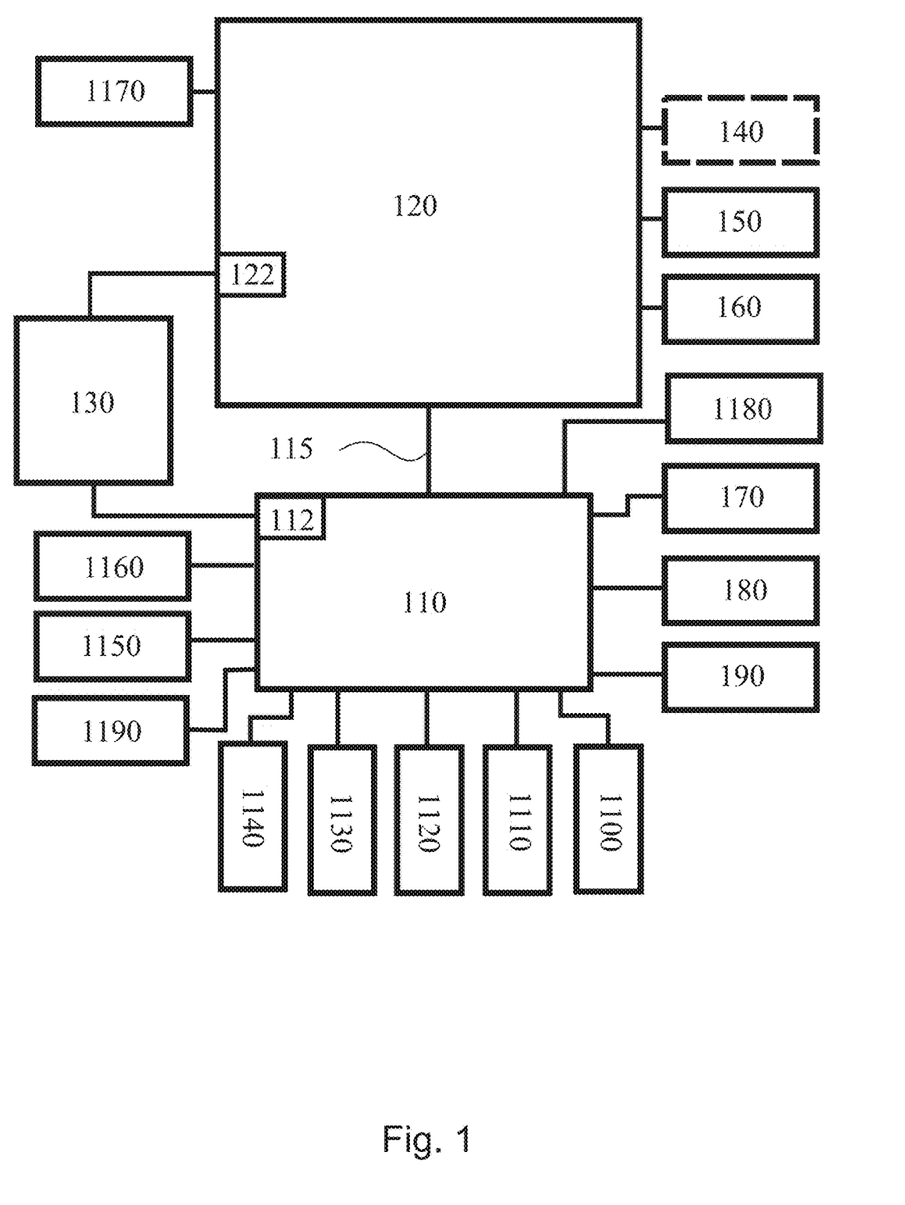
FIG. 1 illustrates an example of an embedded device having two processors and a number of peripherals.

FIG. 1 illustrates an example of a modern embedded device having two processors 110 and 120, each of which comprises at least one processor core. 110 corresponds to, for example, to a less capable processor of a microcontroller consuming less power, and 120 corresponds to, for example, a more capable microprocessor consuming more power. The processors have a number of peripherals, such as user interfaces, sensors and displays. A user may interact with the device using the user interfaces, which may comprise buttons, for example. An embedded device may comprise a connectivity function configured to communicate with a communications network, such as, for example, a wireless communications network. Some embodiments of the present invention may include a similar device like the one in FIG. 1, with modifications according to the invention in order to allow the processors and the applications running on them to communicate with each other, as described below.

The less capable or the more capable one of the processing units may be configured to control, at least in part, the other processing unit. For example, the less capable processing unit having a less capable processing core, may be enabled to cause the more capable processing unit, to transition into and from a hibernating state. These transitions may be caused to occur by signalling via an inter-processing unit interface, such as for example a whiteboard interface.

The illustrated apparatus comprises a microcontroller 110 and a microprocessor 120. Microcontroller 110 may comprise, for example, a Renesas RL78 or Toshiba TLCS-870 microcontroller, or similar. Microprocessor 120 may comprise, for example, a Qualcomm Snapdragon processor or an ARM Cortex-based processor. Microcontroller 110 and microprocessor 120 are in the example of FIG. 1 communicatively coupled with a prior art inter-processing interface 115, which in this case may comprise, for example, a serial or a parallel communication interface.

Each processing unit may comprise one or multiple uniform or heterogeneous processor cores and/or different volatile and non-volatile memories. For example, device 110 may comprise a microcontroller with at least one processing core. It is also possible to integrate the two processors 110 and 120 into the same processing unit or chip, but functionally this may not make any difference to what has been said above about the two processors.

Each of the processing units may be enabled to control a display 130 of the device. The more capable processing unit 120 may be configured to provide a richer visual experience via the display. The less capable processing unit 110 may be configured to provide a reduced visual experience via the display. An example of a reduced visual experience is one which is black-and-white. An example of a richer visual experience is one which uses colours. Colours may be represented with 16 bits or 24 bits, for example.

Microcontroller 110 is communicatively coupled, in the illustrated example, with a buzzer 170, a universal serial bus, USB, interface 180, a pressure sensor 190, an acceleration sensor 1100, a gyroscope 1110, a magnetometer 1120, satellite positioning circuitry 1130, a Bluetooth interface 1140, user interface buttons 1150 and a touch interface 1160. Pressure sensor 190 may comprise an atmospheric pressure sensor, for example. Further examples of peripherals that may be coupled to the microcontroller 110 include an external flash memory 1190, or a sensor hub (not shown) containing or supporting sensors, for example. Such sensor hubs may include processors for providing radio connectivity to Bluetooth or GPS/Glonass (GNSS) circuitry, or the hub may be connected to sensor devices having in-built radio connectivity.

Microprocessor 120 is communicatively coupled with an optional cellular interface 140, a non-cellular wireless interface 150 and a USB interface 160. Microprocessor 120 is further communicatively coupled, via microprocessor display interface 122, with display 130. Microcontroller 110 is likewise communicatively coupled, via microcontroller display interface 122, with display 130. Microprocessor display interface 122 may comprise communication circuitry comprised in microprocessor 120. Microcontroller display interface 112 may comprise communication circuitry comprised in microcontroller 110.

Microcontroller 110 may be configured to determine whether triggering events occur, wherein responsive to the triggering events microcontroller 110 may be configured to cause microprocessor 120 to transition into and out of the hibernating state described above. When microprocessor 120 is in the hibernating state, microcontroller 110 may control display 130 via microcontroller display interface 122. Microcontroller 110 may thus provide, when microprocessor 120 is hibernated, for example, a reduced experience to a user via display 130.

At least two elements illustrated in FIG. 1 may be integrated on a same integrated circuit. For example, microprocessor 120 and microcontroller 110 may be disposed as processing cores in a same integrated circuit. Where this is the case, for example, cellular interface 140 may be a cellular interface of this integrated circuit, comprised in this integrated circuit, with cellular interface 140 being controllable by microprocessor 120 but not by microcontroller 110. In other words, individual hardware features of the integrated circuit may be controllable by one of microcontroller 110 and microprocessor 120, but not both. On the other hand, some hardware features may be controllable by either processing unit. For example, USB interface 160 and USB interface 180 may be in such an integrated embodiment one and the same USB interface of the integrated circuit, controllable by either processing core.

In FIG. 1 are further illustrated memory 1170 and memory 1180. Memory 1170 is used by microprocessor 120, and may be based on random access memory technology, such as DDR2 or DDR3, for example. Memory 1180 is used by microcontroller 110, and may be based on SRAM technology, for example.

Figure 2:
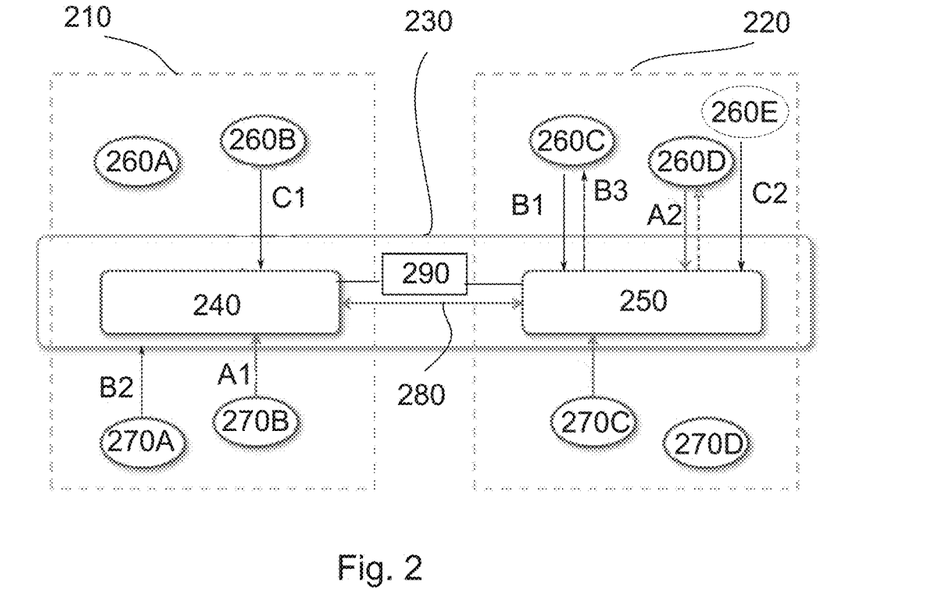
FIG. 2 illustrates a first example apparatus capable of supporting at least some embodiments of the present invention.

FIG. 2 illustrates an example of an inventive solution where a first processing unit 210 is configured to run computer program applications 260A and 260B and is capable of receiving, processing and delivering information to and from a physical whiteboard memory 240. Likewise, a second processing unit 220 is configured to run computer program applications 260C 260E and is capable of receiving, processing and delivering information to and from a physical whiteboard memory 250. External devices 270A-270D, such as user interfaces, sensors, measuring instruments or timing devices are capable of delivering information to the physical whiteboard memory units 240 and 250.

The two physical whiteboards 240 and 250 form together an intra-device logical whiteboard 230 which is a uniquely addressable memory space for both processing units 210 and 220, and consisting of at least the two physical whiteboards 240 and 250, and any further required memory circuitry (not shown). A logical whiteboard need of course to be mapped onto the physical entities that it consists of. The first and second processing units 210 and 220 are thus being connected to the logical whiteboard 230 to send information delivered by an application running in any of the processing units to a second application running in the other processing unit.

A whiteboard may thus be seen as a middleware between processors, which may have their own operating systems and applications, but a common memory space. Logical mapping of a whiteboard may be done by reserving separate name spaces for different entities, like sensors etc. Interface mapping may be required for different programming domains, for example for JavaScript, Java and Objective-C.

For example, a sensor or data provider 270B writes data A1 (e.g. the time, updated every second) to the logical whiteboard 230, to an address residing in the physical memory 240 of the first processing unit 210. A consumer application 260D running in the second processing unit 220 fetch the time information from the physical memory 250 at A2. The communication between the physical memories (and all other whiteboard memories) is handled by an data interchange (inter-whiteboard) protocol, that may be run on top of a bus 280 controlled by a bus controller protocol, like the I$^2$C protocol, for example. I$^2$C may be used for attaching low-speed peripherals (slave nodes) to processing units and microcontrollers (master nodes) in embedded systems. The I$^2$C bus has two roles for nodes: master and slave. The bus is a multi-master bus, which means any number of master nodes can be present. Master and slave roles may also be changed between messages. The four potential modes of operation for a given bus device are:

master transmit—master node is sending data to a slave master receive—master node is receiving data from a slave slave transmit—slave node is sending data to the master slave receive—slave node is receiving data from the master The bus 280 or a common external memory 290 may provide a means for first processing unit to notify the second processing unit that data has been written to a shared information space. An interrupt signal line in the bus 280 may be raised by the first processing unit 210 to provide such notification. The second processing unit 220 may then fetch the data from an agreed address in the whiteboard 230. Alternatively, the first processing unit 210 may be interfaced to a random access memory unit 290 that is also interfaced with the second processing unit 220. Such a memory unit may be an external flash memory unit 1190 as described in connection with FIG. 1, but now and according to the invention interfaced with both processing units 210 and 220. The random access memory unit 290 is configured to receive data written by the first processing unit 210. The data written may be a pointer to an address in the whiteboard 230, for example. The whiteboard 230 is configured to receive the actual payload data written by the first processing unit at said pointer address. The second processing unit may then, once notified of the availability of the address in memory unit 290, read the address from memory unit 290 and fetch the payload data from the whiteboard at the pointed-to address.

Preferably, if the processing units 210 and 220 are residing in separate devices or housings, such as a wristop computer and a handheld or fixedly mounted display device for example, the bus 280 may be implemented in a wireless fashion by using a wireless communication protocol. Radio transceiver units (units 150 and 1140 of FIG. 1) functionally connected to their respective processing units may thus perform the function of the bus 280. The wireless communication protocol can be one used for communication between computers, and/or between any remote sensors, such as a Bluetooth LE or the proprietary ANT+ protocol. These are using direct-sequence spread spectrum (DSSS) modulation techniques and an adaptive isochronous network configuration, respectively. Enabling descriptions of necessary hardware for various implementations for wireless links are available e.g. from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoWPAN, Wi-Fi®.

Another example is shown as a consumer application 260C places at B1 a subscription for data (e.g. GPS data) to the whiteboard. The GPS unit at 270A provides the position coordinates at B2, and the application 260C is notified of the availability of the data at B3. The notification may include the data itself, or it may contain a pointer to a place where the data can be retrieved, as explained above. In a further embodiment, an application 260B running in the first processing unit 210 is configured to write at C1 a control signal to the whiteboard 230, and a second application 260E running in the second processing unit 220 is configured at C2 to read the control signal from the whiteboard 230 and cause the core of the second processing unit 220 to enter a hibernation state. This is a method to provide for a significant reduction in the power consumption of the device. Examples of situations when the processing unit 220 need not be active and its core may be put into a hibernation state are when only background processing of timing and/or sensor devices are required with no or little displaying or communication needs. Activation of the processing unit 220 from a hibernation state, e.g. when the user starts a data-intensive application, may be done in a number of ways, which are outside the scope of the present invention.

The information written to the whiteboard may be a result from automatic inputs from providers, such as time, heart rate or acceleration, for example. The information may in such instances be volatile, i.e. it may be constantly overwritten with current updates. A consumer application (e.g. a heart rate belt) may need then to retrieve the time from the whiteboard and timestamp pulse readings, e.g. in order to store data for a heart rate diagram over time. Alternatively, the data may be requested by a client e.g. storm alert, a compass reading, etc. In such a case, a provider 270 gets order to start working, and the client application 260 fetches the information and displays the alert or reading on a display.

Figure 3:
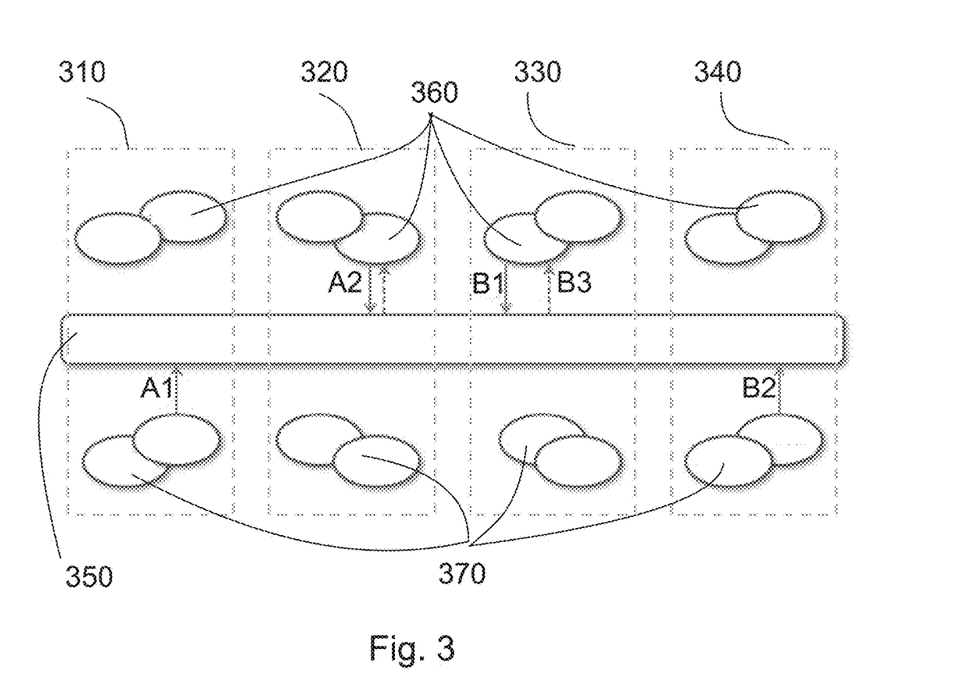
FIG. 3 illustrates a second example apparatus capable of supporting at least some embodiments of the present invention.

In FIG. 3 is shown an alternative embodiment of the inventive solution to provide for a shared memory for multiple processors and their applications. The devices are here grouped for clarity into peripherals 310, devices 320, mobile applications 330 and a cloud computing platform 340. Here, various processing units 360 or "consumers" are connected to an inter-device whiteboard 350 as a shared memory platform, while various data "providers" 370, such as sensors and user interfaces, are likewise connected to the same whiteboard 350. According to the same examples as in FIG. 2, a provider 370 writes at A1 the current time to the whiteboard 350, A consumer application 360 running in a device 320 fetch the time information at A2, as a matter of routine or otherwise, from the whiteboard 350. The management of such an inter-device whiteboard may, for example, be based on a system like REST (Representational State Transfer) protocol, which is a coordinated set of constraints applied to the design of components in distributed systems, and well known in web-based services.

From the examples shown in FIGS. 2 and 3, it is evident that physically, a whiteboard may any kind of accessible memory, i.e. a processor-specific interconnected memory, a shared memory device, or a memory space available on a computer network, such as the internet.

In the second example, a mobile application 330 places a request for data at B1, a data provider 370 operating from the cloud 340 writes the required data at B2, and the same application 330 retrieves the information at B3.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   at least one first processor core configured to run at least one first computer program application capable of receiving and processing signals received from at least one interface or device connected to said first processor core;
   at least one second processor core configured to run at least a second computer program application capable of further processing at least some information processed in said first processor core;
   said first and second processor cores being interfaced with a shared information space, said shared information space consisting of an external memory space configured to serve as a logical memory unit with at least one address space mapped to both the first and the second processing unit,
   whereby a first application running in the first processor core is configured to enable said first processor core to write data retrieved from said processed signals to said information space, and
   a second application running in the second processor core is configured to receive a notification about said data being written to said shared information space, wherein
   said apparatus comprises at least one random access memory unit interfaced with the first and the second processing unit and which is configured to receive address data written by said first processing unit that is pointing to an address in said information space, and whereby said second processing unit is configured to read the written address in said at least one random access memory and to fetch data from said shared information space at said written address for further processing.

2. The apparatus according to claim 1, wherein the first processor core is electrically interfaced with at least one of: a user interface, an a wireless communications port, satellite positioning circuitry, a magnetometer, a gyroscope, an accelerometer and a pressure sensor.

3. The apparatus according to claim 1, wherein the second processor core is electrically interfaced with at least one of: a display, an external memory unit, a sensor, a cellular communication circuitry, a non-cellular wireless communication circuitry and a wired communications port.

4. The apparatus according to claim 1, wherein the shared information space consists of at least one random access memory unit interfaced with each processor core, wherein the memory units are configured to communicate between each other by a data interchange protocol.

5. The apparatus according to claim 1, wherein the shared information space consists of at least one random access memory unit interfaced with at least the first and the second processor core, wherein the memory unit is configured to serve as a logical memory unit with at least one address space mapped to both the first and the second processor core.

6. The apparatus according to claim 1, wherein a first application running in the first processor core is further configured to write a control signal to said information space and to notify a second application running in the second processor core of said control signal, whereby said second application is configured to fetch the control signal from said information space and cause the second processor core to enter a hibernation state.

7. The apparatus according to claim 1, wherein the cores of the first processor core and the second processor core are comprised in the same integrated circuit.

8. The apparatus according to claim 1, wherein the first processor core is a microcontroller and the second processor core is a microprocessor, the microcontroller being external to the microprocessor and the microprocessor being external to the microcontroller.

9. The apparatus of claim 1, wherein the first and second processing unit reside in separate housings or devices.

10. The apparatus according to claim 1, wherein a first application running on said first processor core is adapted to write a current value of a parameter, such as time, to an address in said information space, and a second application running on said second processor core is adapted to retrieve the parameter value from said information space.

11. The apparatus according to claim 10, wherein a first application running on said first processor core overwrites in a constant and frequent fashion the previous value of a parameter with a current value in said information space.

12. The apparatus according to claim 1, wherein a second application running on said second processor core is adapted to put a request for the value of a parameter to be written in said information space, whereby a first application running on said first processor core is adapted to write the parameter value to an address in said information space, and whereby said second application is adapted to fetch the parameter value from said address.

13. The apparatus according to claim 12, wherein a first application running on said first processor core writes a value of a parameter valid for a period of time to an address in said information space, to be accessible for any application running in the apparatus and capable of reading said address.

14. A method, comprising the steps of:
   receiving, by a first processor core, signals from at least one interface or device connected to said first processor core;
   processing said received signals in a first computer program application running on said first processor core;
   enabling said first computer program application to write data retrieved from said processed signals to a shared information space, the shared information space consisting of an external memory space interfaced with said first and second processing unit, and being configured to serve as a logical memory unit with at least one address space being interfaced with said first and second processing unit,
   enabling said first computer program application to write said address to at least one random access memory unit being interfaced with said first and second processing unit,
   reading in a second computer program application running in said second processing unit the address from said at least one random access memory,
   enabling said second computer program application to read said data stored in said shared information space at said address; and
   further processing said data in said second processor core.

15. The method according to claim 14, wherein the first processor core is interfaced with at least one of: a user interface, an external memory unit, a wireless communications port, a wired communications port, satellite positioning circuitry, a magnetometer, a gyroscope, an accelerometer and a pressure sensor.

16. The method according to claim 14, wherein the second processor core is electrically interfaced with at least one of:

a display, an external memory unit, a cellular communication circuitry, non-cellular wireless communication circuitry and a second wired communications port.

17. The method according to claim 14, wherein the shared information space consists of at least one random access memory unit interfaced with each processor core, and wherein the memory units are configured to communicate between each other by a data interchange protocol.

18. The method according to claim 14, wherein the shared information space consists of at least one random access memory unit interfaced with at least the first and the second processor cores, and wherein the memory unit is configured to serve as a logical memory unit with at least one address space mapped to both the first and the second processor cores.

19. The method according to claim 14, further comprising the step of a second application running on said second processor core being adapted to request for the value of a parameter to be written in said information space, whereby a first application running on said first processor core is adapted to write the parameter value to said address, and whereby said second application is adapted to fetch said parameter value from said address.

20. The method according to claim 14, further comprising the step of a first application running on said first processor core being adapted to write a value of a parameter valid for a period of time to an address in said information space, to be accessible for any application running in the apparatus capable of reading said address.

21. The method according to claim 14, wherein a first application running in the first processor core is further configured to:
    writing a control signal to said information space, and
    notifying a second application running in the second processor core of said control signal, and wherein
said second application running in the second processor core is configured to fetch the control signal from said information space and cause the second processor core to enter a hibernation state.

22. The method according to claim 14, wherein the shared information space consists of an external memory unit interfaced with at least the first and the second processor cores, and wherein said external memory unit is configured to serve as a logical memory unit with at least one address space mapped to both the first and the second processor cores.

23. The method according to claim 22, wherein at least one random access memory unit being interfaced with at least the first and the second processor cores,
    receiving in said random access memory address data written by said first processor core that is pointing to an address in said external memory space,
    receiving in said external memory space data written by said first processor core at said address,
    reading with said second processor core the written address in said random access memory,
    fetching by said second processor core data from said shared information space at said address.

24. The method according to claim 14, further comprising the step of a first application running on said first processor core being adapted to write the current value of a parameter, such as time, to an address in said information space, and a second application running on said second processor core being adapted to retrieve the parameter value from said information space.

25. The method according to claim 24, wherein the first application running on said first processor core is adapted to overwrite in a constant and frequent fashion the previous value of a parameter with a current value in said information space.

26. An apparatus comprising:
    in a first processing unit comprising a first processor core,
        means for receiving and processing signals received from at least one interface or device connected to said first processing unit;
        means for enabling the first processor core to write data to a shared information space, said shared information space consisting of an external memory space configured to serve as a logical memory unit with at least one address space mapped to both the first processing unit and a second processing unit,
        means for notifying said second processing unit that data has been written to said shared information space,
    in said second processing unit comprising a second processor core,
        means to enable said second processor core to read from said shared information space data written by said first processor core;
        means to enable further processing of at least some information read from said shared information space being processed in said first processor core, and
        means for further processing of said read data in said second processor core to in order to display, communicate over a communication link, or to cause the second processing unit to enter a hibernation state.

27. A computer program product being stored on a non-transitory computer readable medium, said computer program being configured to cause a method to be performed when run, the method comprising the steps of:
    receiving, by a first processor core, signals from at least one interface or device connected to said first processor core;
    processing said received signals in a first computer program application running on said first processor core;
    enabling said first computer program application to write data retrieved from said processed signals to a shared information space, said shared information space consisting of an external memory space configured to serve as a logical memory unit with at least one address space mapped to both the first and the second processing unit,
    receiving in a second computer program application running in a second processor core a notification of said data written to said shared information space,
    enabling said second computer program application to read said data stored in said shared information space; and
    further processing said data in said second processor core.

* * * * *